(12) United States Patent
Park

(10) Patent No.: US 8,553,576 B2
(45) Date of Patent: Oct. 8, 2013

(54) METHODS OF CO-EXISTENCE FOR WIDEBAND TRANSMISSIONS

(75) Inventor: Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 579 days.

(21) Appl. No.: 12/887,152

(22) Filed: Sep. 21, 2010

(65) Prior Publication Data

US 2012/0069746 A1    Mar. 22, 2012

(51) Int. Cl.
*H04L 12/26*    (2006.01)
(52) U.S. Cl.
USPC ............................... 370/252; 370/338; 455/62
(58) Field of Classification Search
USPC ..................... 370/252, 338; 455/62
See application file for complete search history.

(56) References Cited

U.S. PATENT DOCUMENTS

2008/0080553 A1*   4/2008   Hasty et al. .................... 370/468

OTHER PUBLICATIONS

Channel Selection and Management for 11ac by Yujin Noh.*
RTS & CTS Exchange in wideband transmission by Li Nan.*
Trainin et al., "Device, System and Method of Wireless Communication Over Non-Contiguous Channels", U.S. Appl. No. 12/787,825, filed May 26, 2010, 31 pages.
Park et al., "Multi-Channel Communication Station for Communicating a Multi-Channel PPDU and Methods of Reducing Collisions on Secondary Channels in Multi-Channel Wireless Networks", U.S. Appl. No. 12/825,843, filed Jun. 29, 2010, 30 pages.
Park, Minyoung, "Channel Access Mechanism for Wide Channels Used in Overlapping Networks", U.S. Appl. No. 12/861,086, filed Aug. 23, 2010, 23 pages.
Trainin, Solomon, "Method of Collision Resolution in a Wide Channel", U.S. Appl. No. 12/860,637, filed Aug. 20, 2010, 31 pages.
International Search Report and Written Opinion for PCT Patent Application No. PCT/US2011/052660, mailed on Feb. 17, 2012, 9 pages.
Kang et al., "Channel Selection and Management for 11ac", IEEE 802.11 Working Group, IEEE 802. 11-10/0781r1, Jul. 14, 2010. pp. 6-16.
Kim et al., "160MHz Transmission Flow", IEEE 802.11 Working Group, IEEE 802. 11-10/1063r1, Sep. 13, 2010. pp. 2-11.
Nan et al., "RTS&CTS Exchange in wideband transmission", IEEE 802.11 Working Group, IEEE 802. 11-10/1066r2, Sep. 15, 2010. pp. 9.
Pahlavan et al., "Wideband Local Access: Wireless LAN and Wireless ATM", IEEE Communication Society Magazine, Sep. 15, 1997. pp. 15.

* cited by examiner

*Primary Examiner* — Hassan Kizou
*Assistant Examiner* — Hashim Bhatti
(74) *Attorney, Agent, or Firm* — Scott M. Lane

(57)    ABSTRACT

Embodiments of systems and methods for providing wideband transmission co-existence are generally described herein. Other embodiments may be described and claimed.

20 Claims, 5 Drawing Sheets

METHODS OF CO-EXISTENCE FOR WIDEBAND TRANSMISSIONS

FIELD OF THE INVENTION

This application relates to wireless systems and, more particularly, to systems and methods for co-existence of transmissions in a wireless network comprising legacy systems.

BACKGROUND

An increased throughput, e.g., above 1 Gigabit-per-second (Gbps) per wireless communication client, may be required in order, for example, to satisfy a demand for transferring increased amounts of data within wireless communication networks, such as, for example, wireless local area networks (WLAN) and/or wireless personal area networks (WPAN).

The increased throughput may be achieved, for example, by using a communication link having a wide bandwidth. For example, a bandwidth of more than 80 Mega-Hertz (MHz) may be required in order to provide a throughput greater than 1 Gbps, e.g., in a network operating over a frequency band of 5 Giga-Hertz (GHz) in accordance with the IEEE 802.11 standards.

A plurality of wireless communication channels may be required to achieve the high bandwidth. For example, more than four 20 MHz channels may be required, e.g., according to the IEEE 802.11 standards, in order to achieve a bandwidth of more than 80 MHz.

However, a likelihood of allocating a channel having a wide bandwidth may be relatively low due, for example, to interference, overlapping networks, regulatory limitations, and the like.

BRIEF DESCRIPTION OF THE DRAWINGS

The present invention is illustrated by way of example and not as a limitation in the figures of the accompanying drawings, in which.

DETAILED DESCRIPTION

Figure 1:
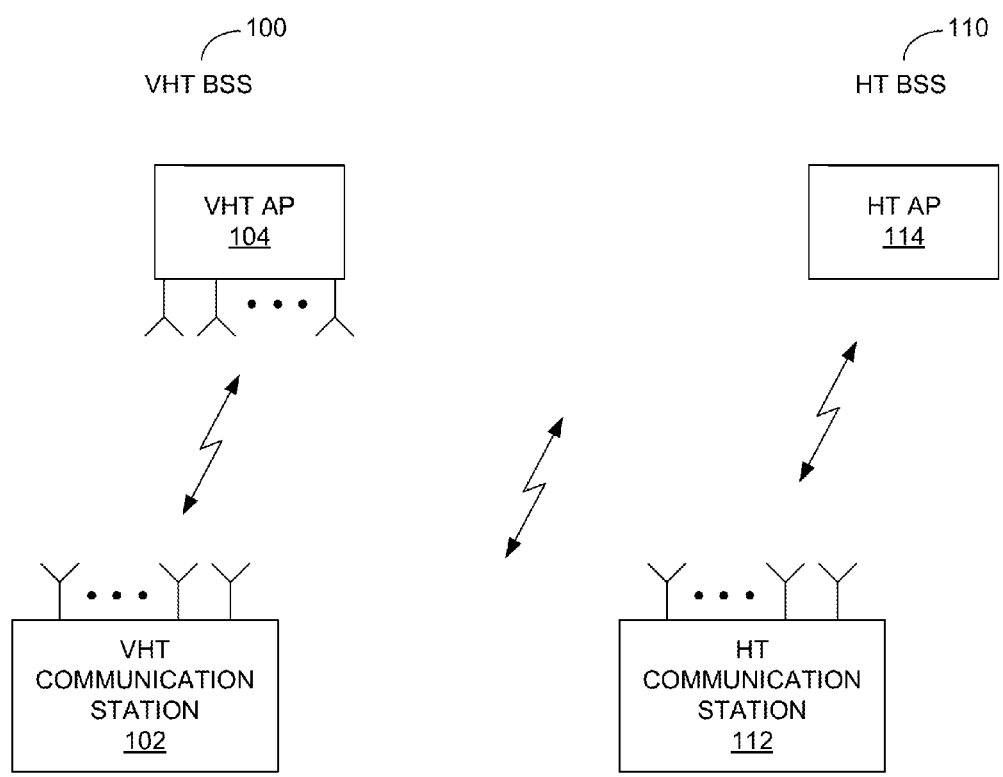
FIG. 1 is an schematic block diagram illustration of neighboring wireless communication networks, in accordance with some demonstrative embodiments.

In the following detailed description, numerous specific details are set forth in order to provide a thorough understanding of embodiments of the invention. However it will be understood by those skilled in the art that embodiments of the invention may be practiced without these specific details. In other instances, well-known methods, procedures, components and circuits have not been described in detail so as not to obscure embodiments of the invention.

Unless specifically stated otherwise, as apparent from the following discussions, it is appreciated that throughout the specification discussions utilizing terms such as "processing," "computing," "calculating," "determining," "selecting," "decoding," or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

The following detailed description describes various embodiments for communicating using a wireless device, platform, user equipment (UE), subscriber station (SS), station, mobile station (MS), advanced mobile station (AMS), high throughput (HT) station (STA), or very HT STA (VHT STA). The various forms of devices described above such as the platform, UE, SS, MS, HT STA, and VHT STA may be interchanged and reference to a particular device does not preclude other devices from being substituted in various embodiment(s). The device may communicate in a network with one or more other devices such as a base station (BS), access point (AP), node, node B, or enhanced node B (eNB). Further, these terms may be conceptually interchanged, depending on which wireless protocol is being used in a particular wireless network, so a reference to BS herein may also be seen as a reference to either of ABS, eNB, or AP as one example. Similarly, a reference to MS herein may also be seen as a reference to either of HT STA, VHT STA, or SS as another example. Reference to a particular device does not preclude other devices from being substituted in various embodiment(s).

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments may be used in conjunction with various devices, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an onboard device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (NV) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with existing IEEE 802.11 (IEEE Standard for Information technology—Telecommunications and information exchange between systems—Local and metropolitan area networks—Specific requirements, Part 11: Wireless LAN Medium Access Control (MAC) and Physical Layer (PHY) Specifications—June 2007), 802.11n, 802.11ac, 802.11 task group ad (TGad) ("the 802.11 standards"), 802.16 (IEEE-Std 802.16, 2004 Edition, Air Interface for Fixed Broadband Wireless Access Systems), 802.16d, 802.16e (IEEE-Std 802.16e, 2005 Edition, Physical and Medium Access Control Layers for Combined Fixed and Mobile Operation in Licensed Bands), 802.16f, 802.16m standards ("the 802.16 standards") and/or future versions and/or derivatives thereof, devices and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (ETDMA), General Packet Radio Service (GPRS), extended GPRS, Code-Division Multiple Access (CDMA), Wideband CDMA (WCDMA), CDMA 2000, single-carrier CDMA, multicarrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2 G, 2.5 G, 3 G, 3.5 G, Enhanced Data rates for GSM Evolution (EDGE), or the like. Other embodiments may be used in various other devices, systems and/or networks.

The term "device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "device" may optionally include a wireless service.

Embodiments pertain to wireless communications. Some embodiments relate to multi-channel wireless networks that communicate packets, such as Physical Layer Convergence Protocol (PLCP) protocol data units (PPDUs), over multiple channels. Some embodiments relate to wireless networks and devices that operate in accordance with one of the IEEE 802.11 standards, including the IEEE 802.11n and IEEE 802.11ac standards.

In the field of communications, including wireless communications, it would be helpful to provide devices and methods for the use of wideband transmissions in wireless environments that include legacy devices configured to communicate using narrower bands, wherein devices configured for wideband transmissions can coexist in a wireless environment, having a number of wireless communication networks, with legacy devices configured to operate over sub-wideband or narrower bands.

For example, in the 5 gigahertz (GHz) band, four sub-bands are provided wherein each sub-band contains a number of channel blocks with a number of channels and each channel has a 5 megahertz (MHz) bandwidth. In this example, the number of channels in each sub-band is not equal, the sub-bands are not necessarily contiguous, and devices in the wireless environment use particular channel blocks depending on wireless protocol and other variables. Systems and methods for providing coexistence for wideband and narrower band transmissions in the wireless environment, while avoiding collisions, can provide very high throughput for those devices configured for wideband transmissions while allowing legacy systems to co-exist and operate in the same wireless environment.

FIG. 1 illustrates neighboring wireless communication networks in accordance with some embodiments. The neighboring wireless communication networks include two or more basic service sets (BSS), such as very-high throughput (VHT) BSS 100 and high-throughput (HT) BSS 110. VHT BSS 100 may include VHT access point (AP) 104 and one or more VHT communication stations (STA) 102, and HT BSS 110 may include neighboring HT AP 114 and one or more HT communication stations (STA) 112. In an embodiment, VHT BSS 100 is configured to operate in accordance with IEEE 802.11ac and the HT BSS 110 is configured to operate in accordance with IEEE 802.11n. Other wireless protocols may be used in additional embodiments.

VHT BSS 100 may utilize a primary channel and up to three or more secondary channels. HT BSS 110, on the other hand, may be limited to using a primary channel and a single secondary channel. VHT communication station 102 and HT communication station 112 may utilize a contention-based collision-avoidance protocol such as the CSMA/CA protocol to contend for access.

When the primary channel utilized by VHT BSS 100 is not the same primary channel utilized by HT BSS 110, one or more of the secondary channels of VHT BSS 100 may reside on the primary channel of HT BSS 110. This may result in a potential increase in collisions.

In accordance with some embodiments, VHT communication station 102 may be configured to communicate a data unit, such as a physical layer convergence procedure (PLOP) protocol data unit (PPDU), on a primary channel and up to three or more secondary channels, and HT communication station 112 may be configured to communicate a PPDU on a primary channel and up to one secondary channel. VHT communication station 102 may be configured to reduce collisions that may occur with HT communication station 112 by detecting packets on the secondary channels of VHT BSS 100. In these embodiments, VHT communication station 102 may perform short preamble detection and guard-interval detection during a contention window to detect a packet transmission on any one of the secondary channels.

Figure 2:
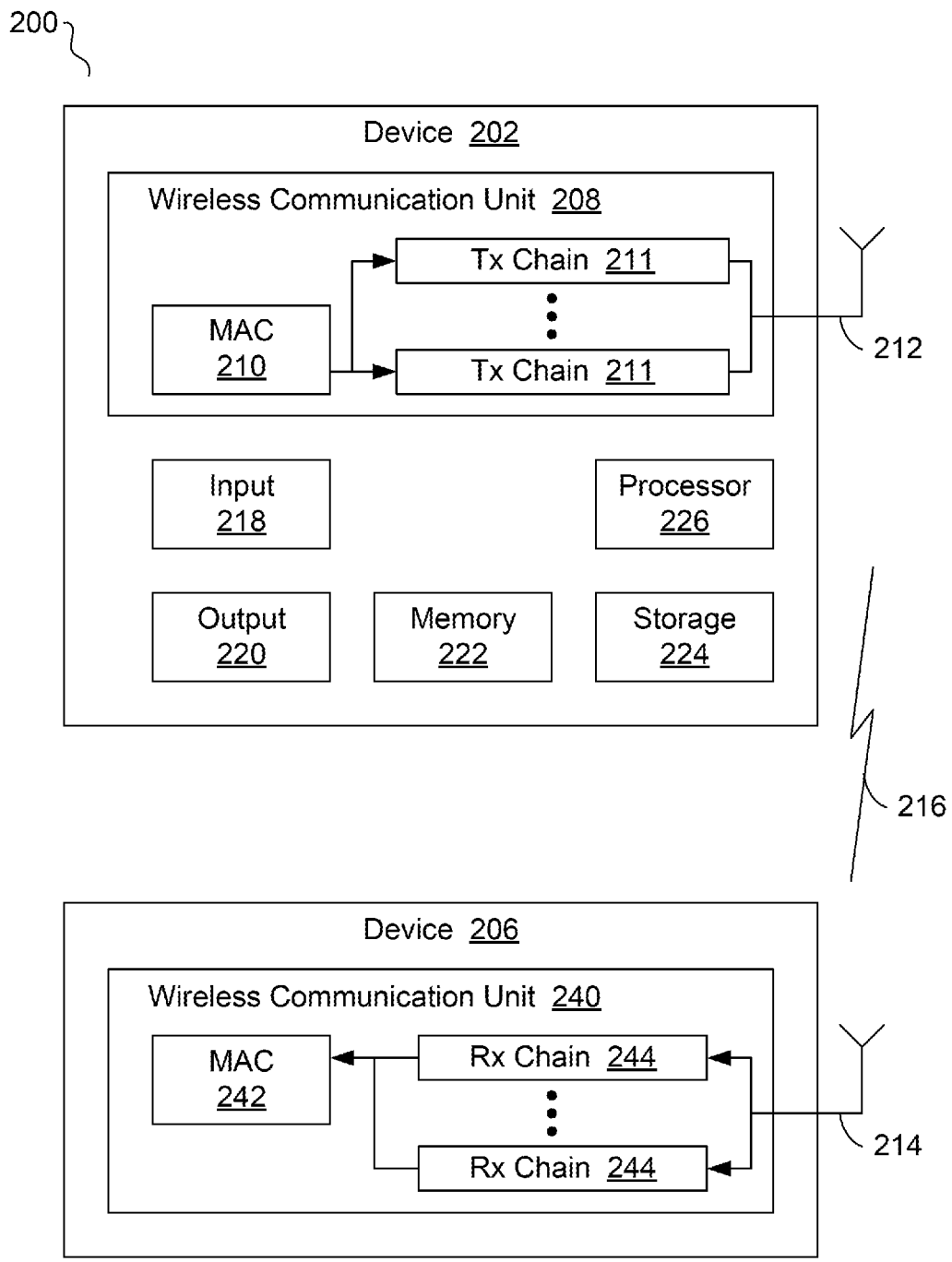
FIG. 2 is a schematic block diagram illustration of a system, in accordance with some demonstrative embodiments.

Reference is now made to FIG. 2, which schematically illustrates a block diagram of a system 200 in accordance with some demonstrative embodiments. In some demonstrative embodiments, system 200 may include one or more wireless communication devices, e.g., wireless communication devices 202 and/or 206, capable of communicating content, data, information and/or signals over a wireless communication link 216. One or more elements of system 200 may optionally be capable of communicating over any suitable wired communication links.

In some demonstrative embodiments, wireless communication devices 202 and/or 206 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a handset, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an NV device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, a base station, the VHT STA 102, the VHT AP 104, the HT STA 112, the HT AP 114, or the like.

In some demonstrative embodiments, device 102 may include a wireless communication unit 208 to transmit, via one or more antennae 212, a wireless transmission to device 206 over wireless communication link 216. Device 206 may include a wireless communication unit 240 to receive the wireless transmission via one or more antennae 214. Types of antennae that may be used for antennae 212 and/or 214 may include but are not limited to internal antenna, dipole antenna, omni-directional antenna, a monopole antenna, an end fed antenna, a circularly polarized antenna, a micro-strip antenna, a diversity antenna and the like.

In some demonstrative embodiments, wireless communication link 216 may have a wideband bandwidth of at least 160 Mega-Hertz (MHz). In other embodiments, wireless communication link 216 may have any other suitable sub-wideband bandwidth, e.g. 80 MHz, 40 MHz, 20 MHz. In other embodiments, wideband may be 80 MHz in bandwidth and sub-wideband may be 40 MHz or less in bandwidth, though the embodiments are not so limited.

In some demonstrative embodiments, wireless communication devices 202 and/or 206 may also include, for example, one or more of a processor 226, an input unit 218, an output unit 220, a memory unit 222, and a storage unit 224. Wireless communication devices 202 and/or 206 may optionally include other suitable hardware components and/or software components. In some demonstrative embodiments, some or all of the components of each of wireless communication devices 202 and/or 206 may be enclosed in a common housing or packaging, and may be interconnected or operably associated using one or more wired or wireless links. In other embodiments, components of each of wireless communication devices 202 and/or 206 may be distributed among multiple or separate devices.

Processor 226 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 226 executes instructions, for example, of an Operating System (OS) of wireless communication devices 202 and/or 206 and/or of one or more suitable applications.

Input unit 218 includes, for example, a keyboard, a keypad, a mouse, a touch-pad, a track-ball, a stylus, a microphone, or other suitable pointing device or input device. Output unit 220 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 222 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 224 includes, for example, a hard disk drive, a floppy disk drive, a Compact Disk (CD) drive, a CD-ROM drive, a DVD drive, or other suitable removable or non-removable storage units. Memory unit 222 and/or storage unit 224, for example, may store data processed by wireless communication device 202 and/or 206.

In some demonstrative embodiments, wireless communication link 216 may include a number of non-contiguous wireless communication channels.

The phrase "non-contiguous channels", as used herein, may refer to two or more wireless communication channels, which are not adjacent, neighboring, and/or bordering one another. In one example, first and second wireless communication channels may be noncontiguous if, for example, the first wireless communication channel is separated from the second wireless communication channel, e.g., by one or more other wireless communication channels, sub-channels, frequency bands, and the like.

In some demonstrative embodiments, at least one channel of the plurality of noncontiguous channels has a bandwidth at least 5 MHz. In other embodiments, the non-contiguous wireless communication channels may have any other suitable bandwidth.

Some demonstrative embodiments are described below with reference to a wireless communication link, e.g., wireless communication link 216. In one example, the wireless communication link may include at least one channel having a bandwidth of 80 MHz and at least one channel having a bandwidth different from 80 MHz, e.g., 20 MHz, 40 MHz, 120 MHz, 160 MHz and the like. For example, the 80 Mhz channel may include four contiguous 20 MHz channels, e.g., in accordance with the 802.11 standards and/or any other suitable standard and/or protocol.

In some demonstrative embodiments, wireless communication unit 208 may include a plurality of transmit (Tx) chains 211 to transmit the wireless transmission over the plurality of wireless communication channels. Wireless communication unit 240 may include a plurality of receive (Rx) chains 244 to receive the wireless transmission over the plurality of wireless communication channels. In some demonstrative embodiments, Tx chains 211 and/or Rx chains 244 may include any suitable Physical-layer (PHY) chains and/or components; any suitable Radio-Frequency (RF) chains and/or components; and/or any other suitable elements.

In some demonstrative embodiments, wireless communication unit 208 may include a media-access-controller (MAC) 210, e.g., a single MAC, to commonly control the transmissions via Tx chains 211; and/or wireless communication unit 240 may include a MAC 242, e.g., a single MAC, to commonly control the reception via Rx chains 244, e.g., as described in detail below.

In some demonstrative embodiments, MAC 210 may control Tx chains 211 to simultaneously transmit symbols of a wireless communication packet over the plurality of wireless communication channels of wireless communication link 216. MAC 242 may control Rx chains 244 to simultaneously receive the symbols of the wireless communication packet over the plurality of wireless communication channels of wireless communication link 216.

Figure 3:
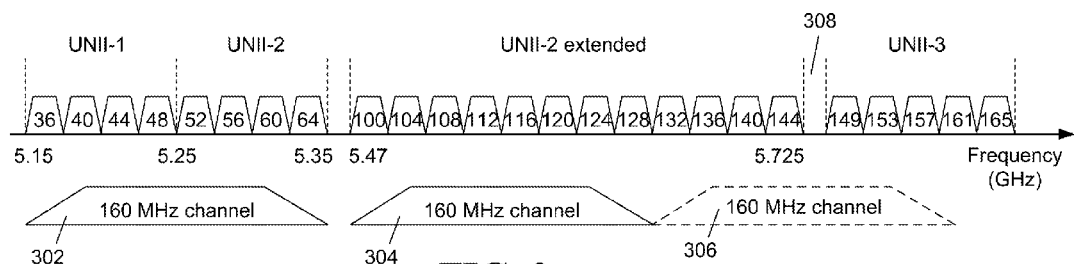
FIG. 3 is a block diagram illustration of channel allocations, in accordance with some demonstrative embodiments.

FIG. 3 is a block diagram illustration of channel allocations, in accordance with some demonstrative embodiments. The block diagram illustrates part of a wireless spectrum in a 5 gigahertz (GHz) band wherein portions of the 5 GHz band are allocated as unlicensed bands and referred to as Unlicensed National Information Infrastructure (UNII) radio bands. The UNII radio bands are part of the radio frequency spectrum used by IEEE-802.11 devices and many wireless network service providers and is a is an Federal Communications Commission (FCC) regulatory domain for 5-GHz wireless devices in the United States. The UNII radio bands are categorized, for purposes of this application, as a UNII-1 band, a UNII-2 band, a UNII-2 extended band, and a UNII-3 band. The bands may be further categorized according to power limitations, frequency bandwidth, and number of channels allocated to each band wherein the channels may be grouped together in channel blocks.

Reference to particular bands within the 5 GHz band may differ depending on location. For example, the bands illustrated in FIG. 3 reflect embodiments that may apply to the United States. Frequency ranges for each band may differ in alternate embodiments. As shown in FIG. 3, the UNII-1 band ranges between 5.15 to 5.25 GHz and the UNII-1 band comprises four even-numbered channel blocks ranging from 36 to 48 wherein each channel block contains four 5 MHz channels for a total bandwidth of 20 MHz. Reference herein to a channel block may refer to a single channel or may refer to multiple channels aggregated in the channel block. Four channels may be included in each channel block, however fewer or additional channels (e.g. 2, 3, 5, or 6) may be used to comprise a channel block.

In an embodiment, transmission power levels in multiple bands and/or channels will be the same or substantially the same. As an example, transmission of a 160 MHz channel across the UNII-1 and UNII-2 bands or the UNII-2 extended and the UNII-3 bands will be performed at the same or substantially the same power level across the 160 MHz channel. In another embodiment, multiple power levels will be applied across the 160 MHz channel. For example, a first power level may be used to transmit the 160 MHz channel in the UNII-1 band while a second power level may be used to transmit 160 MHz channel in the UNII-2 band.

Similarly, the UNII-2 band contains four 5 MHz channel blocks for a total bandwidth of 20 MHz between 5.25 to 5.35 GHz and ranges between even-numbered channel blocks 52 to 64. A UNII-2 extended band, which may also be referred to as a UNII Worldwide band, ranges between 5.47 and 5.725 GHz and contains twelve 5 MHz even-numbered channel blocks from 100 to 144. In this embodiment, a 5 MHz gap follows the UNII-2 extended band and precedes a UNII-3 band. The UNII-3 band extends to 5.825 GHz and contains five 5 MHz odd-numbered channel blocks from 149 to 165. Frequency labels in FIG. 3 refer to established limits for corresponding UNII bands.

In an embodiment, channel blocks 36 to 64 wherein each channel block has a bandwidth of 20 MHz ranges between 5.17 GHz and 5.33 GHz and channel blocks 36 to 64 are situated in the UNII-1 and UNII-2 bands. Channel blocks 100 to 140 wherein each channel block has a bandwidth of 20 MHz ranges between 5.49 GHz and 5.71 GHz and channel blocks 100 to 140 are situated in the UNII-2 extended band. Further, channel blocks 149 to 165 wherein each channel block has a bandwidth of 20 MHz ranges between 5.735 GHz and 5.835 GHz and channel blocks 149 to 165 are situated in the UNII-3 band. In alternate embodiments, channel block numbers and the frequency bandwidth that the channels occupy in each band may change depending on regulatory requirements or other limitations.

Transmission of a data stream in a number of channels may vary depending on a wireless protocol used for communications. For example, according to 802.11ac (TGac) draft specification, 80 MHz PHY transmission for the VHT BSS 100 is supported using two adjacent 40 MHz channels. For the 80 MHz transmission, channel blocks 36 and 40 are two adjacent channel blocks, that when combined provide a total bandwidth of 40 MHz. Further, channel blocks 44 and 48 also provide a total bandwidth of 40 MHz. A combination of channel blocks 36, 40, 44, and 48 provide a total contiguous bandwidth of 80 MHz for transmission. The combination of channel blocks 36-48 can provide a first frequency portion for 160 MHz transmission. A second frequency portion for 160 MHz transmission may include channel blocks 52, 56, 60, and 64, wherein the second frequency portion is 80 MHz in bandwidth. The contiguous first and second frequency portions allow for contiguous transmission in a first 160 MHz channel 302. The first frequency portion and the second frequency portion may also be referred to as a lower and upper frequency portion in some embodiments.

A second 160 MHz channel 304 may be formed using channel blocks 100 through 120 in the UNII-2 extended band, wherein the second 160 MHz channel 304 may be formed from two or more frequency portions. A third 160 MHz channel 306, wherein the third 160 MHz channel is also contiguous, for transmission in the 5 GHz band is prevented due to frequency gap 308 as illustrated in FIG. 3. The frequency gap 308 may be 5 MHz or larger in bandwidth (e.g. 10, 15, 20 or the like).

Figure 4:
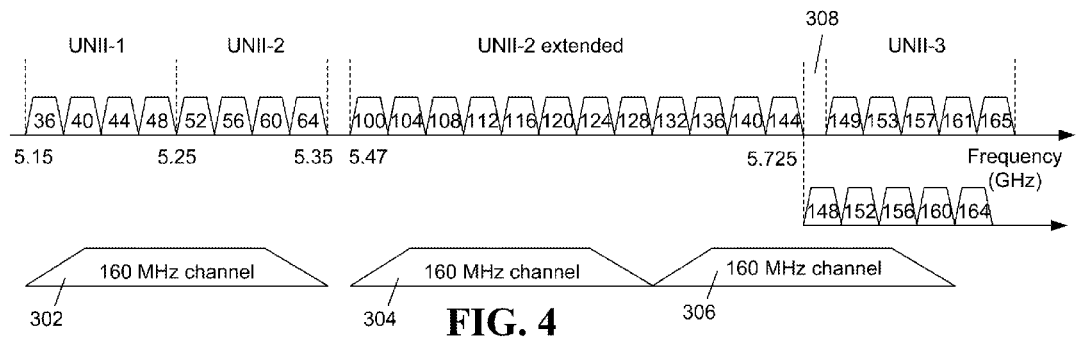
FIG. 4 is a block diagram illustration of channel allocations, in accordance with some demonstrative embodiments.

FIG. 4 is a block diagram illustration of channel allocations, in accordance with some demonstrative embodiments. The gap 308 in these embodiments is removed by rearranging channel block numbers in the UNII-3 band. The odd numbered channel block numbers of the UNII-3 band, including channel blocks 149, 153, 157, 161, and 165 are substituted with even numbered channel block numbers 148, 152, 156, 160, and 164 while eliminating gap 308. Removal of the gap 308 provides a contiguous set of channel blocks (100-164)

from the UNII-2 extended band through the UNII-3 band and allows for a new channel allocation. The third 160 MHz channel 306 provides for three 160 MHz channels in the 5 GHz band, however, the embodiment is not so limited and may be applied to other frequency spectrums or bands.

Figure 5:
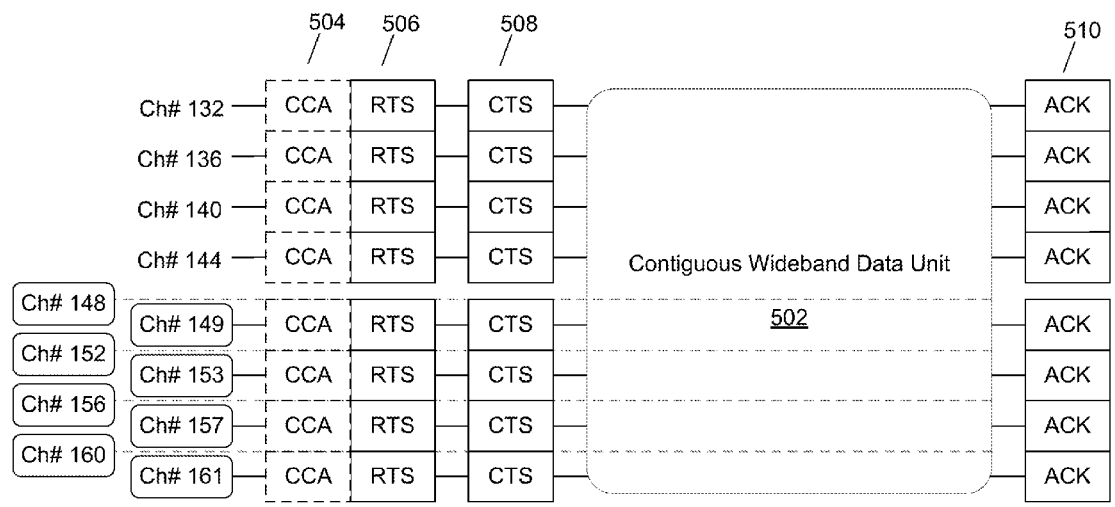
FIG. 5 is a block diagram illustration of wideband transmission, in accordance with some demonstrative embodiments.

Three contiguous and non-overlapping channels in the 5 GHz band may be provided by defining new channelization in the UNII-3 band. However, it may create a coexistence problem between devices configured to operate using 160 MHz channels, such as the VHT communication station 102 and the VHT AP 104 of FIG. 1, and legacy devices configured to operate using the odd-numbered channels of the UNII-3 band as described earlier. For example, the HT communication station 112 and/or the HT AP 114 of FIG. 1 operating in the odd numbered channel blocks of the UNII-3 may not detect transmissions from the VHT communication station 102 and/or the VHT AP 104 that use the even-numbered channel blocks (132 to 160), including the even-numbered channel blocks of the UNII-3 band, for 160 MHz transmissions. To provide coexistence, channel access rules can be applied to provide fair access to VHT devices and legacy devices operating within a BSS or in separate overlapping BSSs. The channel access rules can ensure that transmissions from the VHT device, such as the VHT communication station 102 and/or the VHT AP 104 are protected from legacy channel access for a duration of the VHT transmission, which may include a contiguous wideband data unit 502 of FIG. 5.

Coexistence may be provided to avoid collisions between the legacy devices and the VHT devices, wherein reference to the legacy device may be the HT STA 112, the HT AP 114, or another device operating with a narrower bandwidth than the VHT device, wherein reference to the VHT device may be the VHT STA 102 and/or the VHT AP 104. Using VHT device channel selection rules for operation across two frequency bands such as the UNII2-extended band and even numbered channel blocks of the UNII-3 band, one or more odd numbered channel blocks of UNII-3 band are scanned in element 602 of FIG. 6 by the VHT device, wherein the odd-numbered channels may include one or more of channel blocks 149, 153, 157, 161, and 165. If there are one or more odd-numbered channels of the UNII-3 band being used by a legacy device, the VHT device does not use a contiguous wideband channel, such as a 160 MHz channel which may include one or more of channel blocks 132, 136, 140, 144, 148, 152, 156, and 160. Alternatively, the VHT device operates using a 80 MHz channel in one of the UNII bands or the VHT device may operate in a non-contiguous 160 MHZ mode, such as an 80 MHz channel in the UNII-1, UNII-2, or UNII-2 extended band and odd numbered channels of the UNII-3 band.

Figures 6, 7:
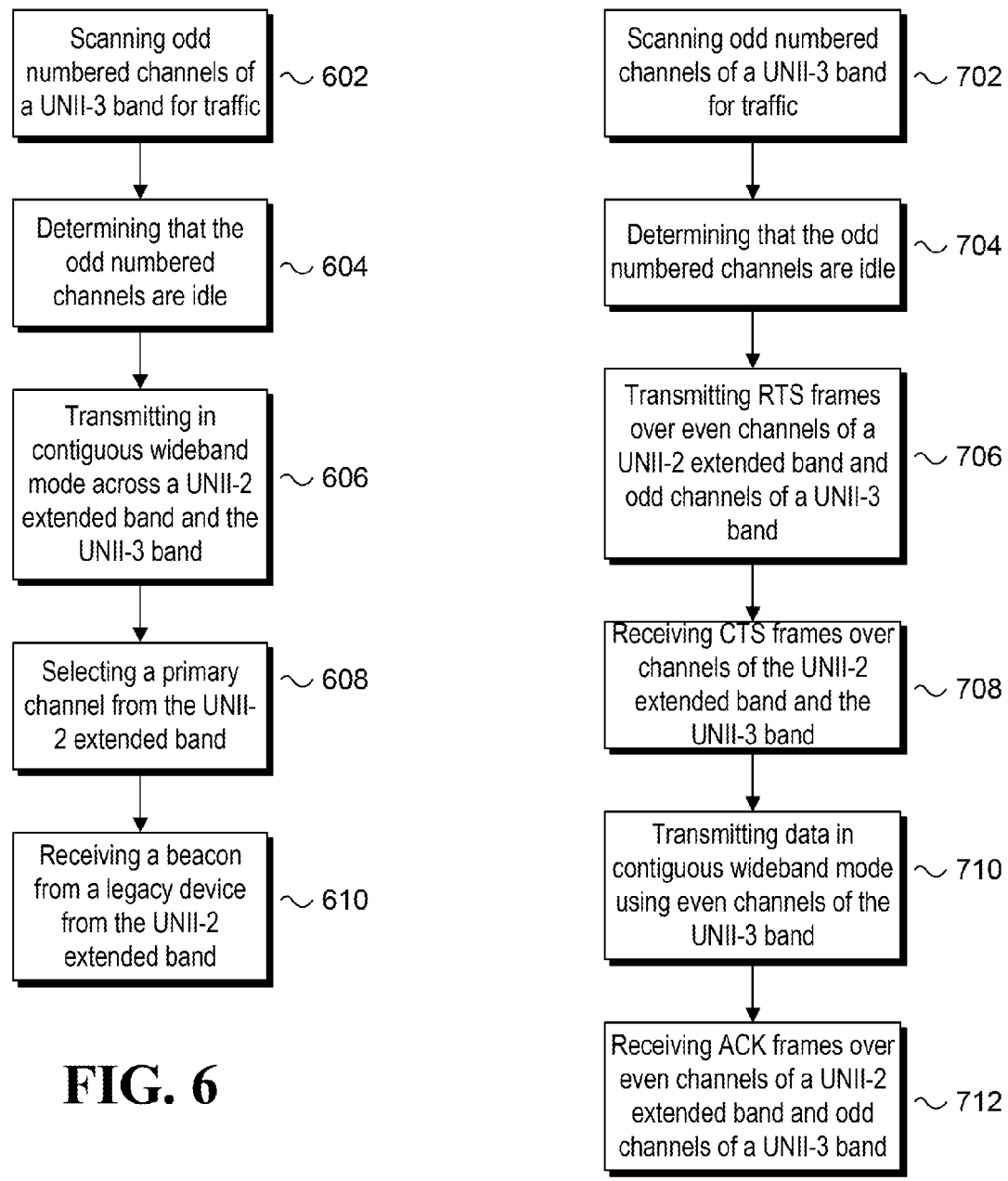
FIG. 6 is a block diagram illustration of methods for wideband transmission, in accordance with some demonstrative embodiments.
FIG. 7 is a block diagram illustration of methods for wideband transmission, in accordance with some demonstrative embodiments

If it is determined that the odd numbered channels of the UNII-3 band are idle in element 604 of FIG. 6, the VHT device may operate and transmit in contiguous 160 MHz mode using both the UNII-2 extended band channel blocks 132 to 144 and the even channel block numbers of UNII-3, including channel blocks 148 through 160 as described in element 606 of FIG. 6. The VHT device selects a primary channel in element 608 of FIG. 6, wherein the primary channel may be designated to any 20 MHz subchannel in the UNII-2 extended band to allow a legacy device to receive beacons from the primary channel from the VHT device to allow the legacy device to join the VHT BSS 100 operating in contiguous 160 MHz mode. The VHT device may transmit on the primary channel to allow a legacy device to receive beacons from one of the channel blocks from the VHT device. The VHT device receives a beacon from the legacy device in element 610 over the UNII-2 extended band.

Coexistence may also be provided using contiguous 160 MHz transmission rules for VHT devices, wherein the contiguous wideband data unit 502 is transmitted using a data unit such as a PPDU. One or more odd numbered channel blocks of UNII-3 band are sensed or scanned in element 702 of FIG. 7 by the VHT device, wherein the odd-numbered channels may include one or more of channel blocks 149, 153, 157, 161, and 165. In another embodiment, the VHT device scans all eight channel blocks including even numbered channel blocks 132 to 144 of the UNII-2 extended band and the odd-numbered channel blocks 149 to 161 of the UNII-3 band to see if there are any transmissions from a legacy device.

If the odd-numbered channel blocks 149 to 161 of the UNII-3 band are not idle, for example the VHT device with carrier sense multiple access with collision avoidance CCA 504 indicates that one or more of the odd-numbered channel blocks 149 to 161 of the UNII-3 band are busy, the VHT device operates using 80 MHz mode. The VHT device may re-scan later to determine if the channel blocks are idle for a period of time and may continue to prepare for contiguous 160 MHz wideband transmission. If and when the channel blocks are idle for a necessary amount of time in element 704, the VHT device transmits request to send (RTS) frames 506 over the channel blocks which may be one or more odd numbered channel blocks of UNII-3, wherein the odd-numbered channels may include one or more of channel blocks 149, 153, 157, 161, and 165.

In another embodiment, the VHT device transmits request to send (RTS) frames 506 including even numbered channel blocks 132 to 144 of the UNII-2 extended band and the odd-numbered channel blocks 149 to 161 of the UNII-3 band of element 706. Transmission of the RTS frames 506 allows the legacy devices to determine how long transmissions will last to prevent or avoid collisions between the VHT device and legacy devices operating in the UNII-3 band.

Upon receiving the RTS frames 506 from the VHT device, a receiver replies with clear to send (CTS) frame(s) 508 over one or more channel blocks such as the even numbered channel blocks 132 to 144 of the UNII-2 extended band and the odd-numbered channel blocks 149 to 161 of the UNII-3 band. The CTS frame(s) 508 are received by the VHT device in element 708. The VHT device transmits data in contiguous wideband mode in element 710 over the even numbered channel blocks 132 to 144 of the UNII-2 extended band and the even-numbered channel blocks 148 to 160 of the UNII-3 band. In this embodiment, the VHT device transmits using a 160 MHz channel, however narrower or wider bandwidths may also be used in other embodiments. The VHT device then receives acknowledgement (ACK) frame(s) 510 as illustrated in element 712 over one or more channel blocks. In an embodiment, the VHT device receives ACK frames 510 over the even numbered channel blocks 132 to 144 of the UNII-2 extended band and the odd-numbered channel blocks 149 to 161 of the UNII-3 band.

The operations discussed herein may be generally facilitated via execution of appropriate firmware or software embodied as code instructions on tangible media as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

While certain features of the invention have been illustrated and described herein, many modifications, substitutions, changes, and equivalents will now occur to those skilled in the art. It is, therefore, to be understood that the appended claims are intended to cover all such modifications and changes as fall within embodiments of the invention.

What is claimed is:

1. A method to communicate using wideband transmissions, comprising:
   scanning odd numbered channel blocks of an unlicensed national information infrastructure 3 (UNII-3) band for traffic;
   determining that the odd numbered channel blocks are idle;
   transmitting data in a contiguous wideband basic service set (BSS) across even numbered channel blocks of a UNII-2 extended band and even numbered channel blocks of the UNII-3 band;
   selecting a primary channel from the UNII-2 extended band; and
   receiving a beacon over the UNII-2 extended band from a legacy device, wherein the legacy device joins the contiguous wideband BSS operating over the even numbered channel blocks of the UNII-2 extended band.

2. The method of claim 1, further comprising operating in a sub-wideband mode if the odd numbered channel blocks of the UNII-3 band are not idle.

3. The method of claim 1, further comprising operating in a non-contiguous wideband mode if the odd numbered channel blocks of the UNII-3 band are not idle.

4. The method of claim 3, wherein the non-contiguous wideband mode comprises operating over even numbered channel blocks of the UNII-2 extended band and odd numbered channel blocks of the UNII-3 band.

5. The method of claim 2, further comprising transmitting in contiguous wideband mode over even numbered channel blocks of a UNII-1 band.

6. The method of claim 1, wherein three wideband channels are available for transmission in a 5 gigahertz band.

7. The method of claim 6, wherein wideband channel transmissions are 160 megahertz wide.

8. A method to provide wideband transmissions in a legacy network, comprising:
   scanning odd numbered channel blocks of an unlicensed national information infrastructure 3 (UNII-3) band for traffic;
   determining that the odd numbered channel blocks are idle;
   transmitting request to send (RTS) frames over even numbered channel blocks of a UNII-2 extended band and the odd numbered channel blocks of the UNII-3 band;
   receiving clear to send (CTS) frames over the even numbered channel blocks of the UNII-2 extended band and the odd numbered channel blocks of the UNII-3 band;
   transmitting data in contiguous wideband mode over the even numbered channel blocks of the UNII-2 extended band and even numbered channel blocks of the UNII-3 band; and
   receiving acknowledgement (ACK) frames over the even numbered channel blocks of the UNII-2 extended band and the odd numbered channel blocks of the UNII-3 band.

9. The method of claim 8, further comprising scanning even numbered channel blocks of the UNII-2 extended band for traffic.

10. The method of claim 9, further comprising operating in a sub-wideband mode if the odd numbered channel blocks of the UNII-3 band are not idle.

11. The method of claim 8, wherein the even numbered channel blocks of the UNII-2 extended band consist of channel blocks 132, 136, 140, and 144 and the odd numbered channel blocks of the UNII-3 band consist of channels 149, 153, 157, and 161.

12. The method of claim 8, wherein each channel block contains 4 channels.

13. The method of claim 8, wherein the wideband transmissions are 160 megahertz wide.

14. The method of claim 8, wherein the data is transmitted using a physical layer convergence procedure (PLCP) protocol data unit (PPDU).

15. The method of claim 8, wherein the wideband transmissions are sent using an 802.11ac protocol and the legacy network is an 802.11n network.

16. A system to provide wideband transmissions in a legacy network, comprising:
   an antenna;
   a processor configured to determine if channel blocks in an unlicensed national information infrastructure (UNII) band are idle; and
   a wireless communication unit configured to:
      scan odd numbered channel blocks of an UNII-3 band for traffic;
      transmit request to send (RTS) frames over even numbered channel blocks of a UNII-2 extended band and odd numbered channel blocks of the UNII-3 band;
      receive clear to send (CTS) frames over the even numbered channel blocks of the UNII-2 extended band and the odd numbered channel blocks of the UNII-3 band;
      transmit data in contiguous wideband mode over the even numbered channel blocks of the UNII-2 extended band and even numbered channel blocks of the UNII-3 band; and
      receive acknowledgement (ACK) frames over the even numbered channel blocks of the UNII-2 extended band and the odd numbered channel blocks of the UNII-3 band.

17. The system of claim 16, further comprising operating in a sub-wideband mode if the odd numbered channel blocks of the UNII-3 band are not idle.

18. The system of claim 16, wherein the even numbered channel blocks of the UNII-2 extended band consist of channels 132, 136, 140, and 144 and the odd numbered channel blocks of the UNII-3 band comprise channels 149, 153, 157, and 161.

19. The system of claim 16, wherein each channel block contains 4 channels.

20. The system of claim 16, wherein the wideband transmissions are 160 megahertz wide.

* * * * *